United States Patent [19]

Kojima et al.

[11] 4,253,723
[45] Mar. 3, 1981

[54] APPARATUS FOR OPTICALLY READING INFORMATION FROM A RECORD CARRIER

[75] Inventors: Chiaki Kojima; Takashi Otobe, both of Yokohama; Hiroshi Ohki, Tokyo, all of Japan

[73] Assignee: Sony Corporation, Tokyo, Japan

[21] Appl. No.: 841,210

[22] Filed: Oct. 11, 1977

[30] Foreign Application Priority Data

Oct. 15, 1976 [JP] Japan .................................. 51-124119
Oct. 15, 1976 [JP] Japan .................................. 51-124120

[51] Int. Cl.³ .......................... G02B 5/32; G11B 7/12
[52] U.S. Cl. ................................. 350/3.72; 369/103; 369/109
[58] Field of Search .................. 179/100.3 V, 100.3 G; 358/128; 350/3.71–3.73, 3.75, 3.78, 3.79

[56] References Cited

U.S. PATENT DOCUMENTS

| | | | |
|---|---|---|---|
| 3,614,189 | 10/1971 | Stewart et al. | 350/3.78 |
| 3,658,403 | 4/1972 | Greenaway et al. | 350/3.73 |
| 3,785,736 | 1/1974 | Spitz et al. | 350/3.73 |
| 3,795,768 | 3/1974 | Locke | 350/3.71 |
| 3,833,893 | 9/1974 | Rajchman | 350/3.73 |
| 3,909,608 | 9/1975 | LeMerer et al. | 179/100.3 G |
| 3,913,076 | 10/1975 | Lehureau et al. | 179/100.3 G |
| 3,953,105 | 4/1976 | Ih | 350/3.71 |
| 4,051,527 | 9/1977 | Braat | 179/100.3 G |
| 4,113,343 | 9/1978 | Pole et al. | 350/3.71 |
| 4,165,464 | 8/1979 | Ikeda et al. | 350/3.71 |

Primary Examiner—Ronald J. Stern
Attorney, Agent, or Firm—Lewis H. Eslinger

[57] ABSTRACT

Apparatus for reading optically detectable indicia on a record carrier, such as video information which is recorded in the form of pits on a record medium, for example, a video disc. A source of coherent light transmits a beam to the record carrier. A hologram is interposed between the coherent light source and the carrier, the hologram serving to focus the beam on the record carrier. The intensity of the focussed beam is modulated by the recorded indicia, and at least one photodetector is disposed in an optical path traversed by the modulated beam so as to detect the intensity thereof. In a preferred embodiment, the hologram focusses the beam onto the surface of the record medium whereat it is modulated and reflected therefrom to the photodetector. Plural photodetectors may be provided in separate optical paths traversed by the reflected light so as to produce outputs which, upon comparison with each other, represent deviations, or tracking errors, in the location of incidence of the light beam on the record medium. In yet another embodiment, the hologram directs the coherent light to the record medium along two different optical paths so that the reflection of one beam can be used to read out the recorded information and the reflection of the other beam can be used to detect focussing fluctuations. In a still further embodiment, another hologram is used to receive and direct reflected light to the photodetector.

6 Claims, 24 Drawing Figures

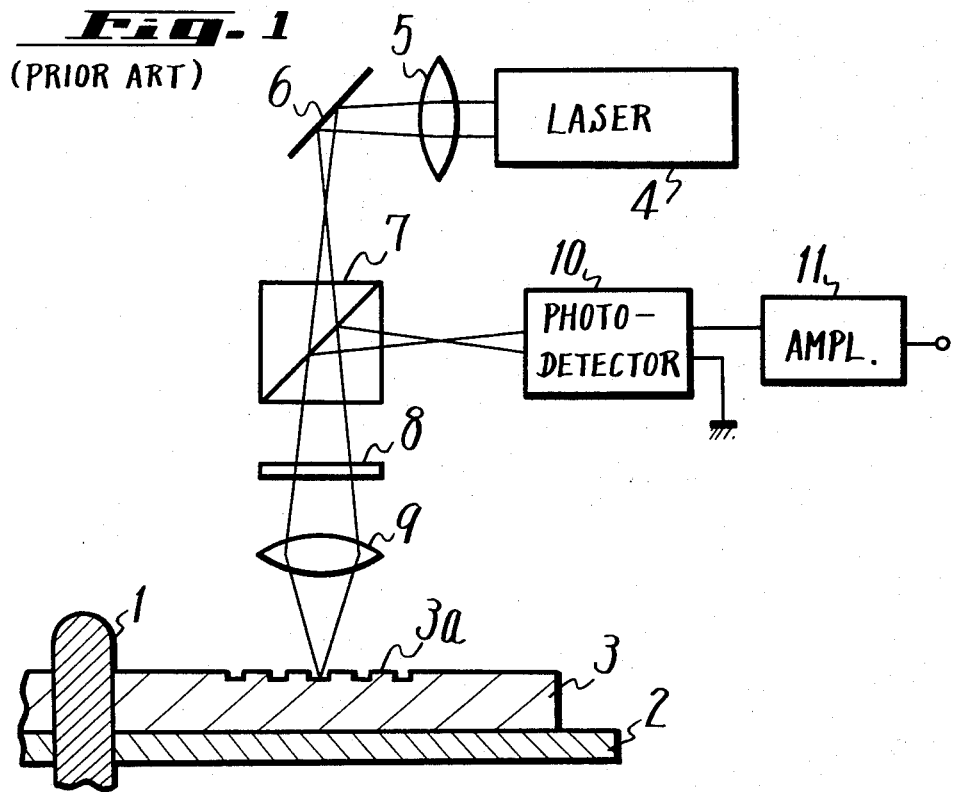
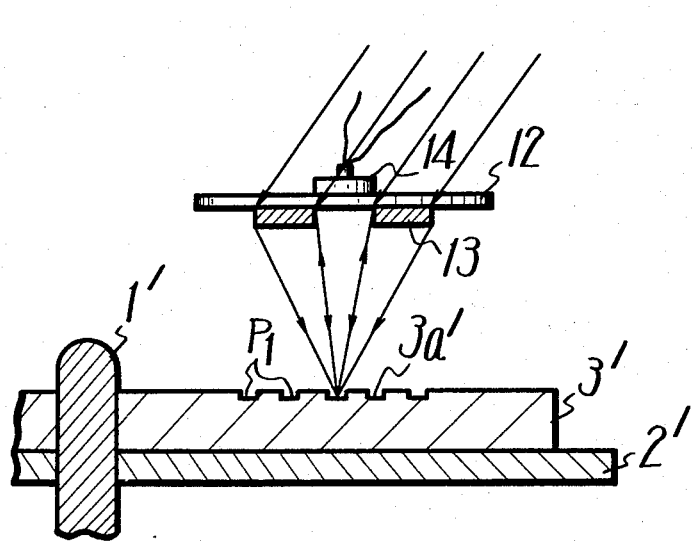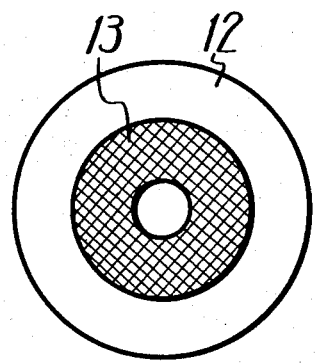

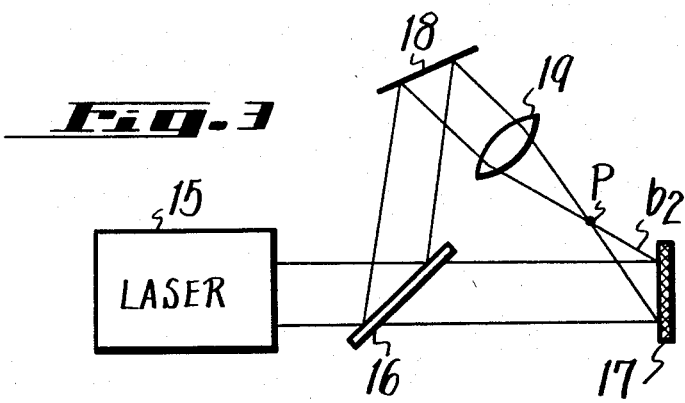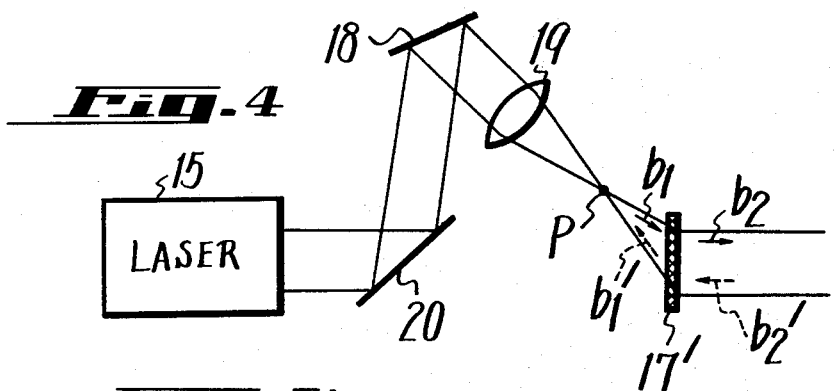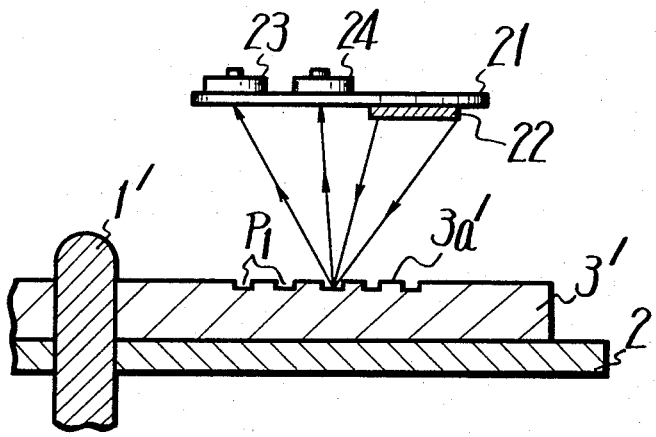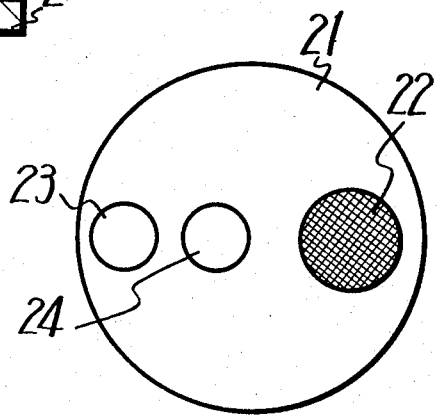

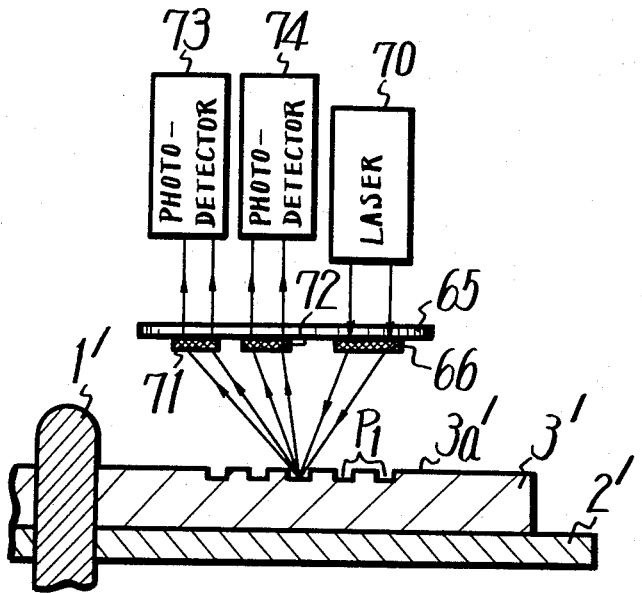
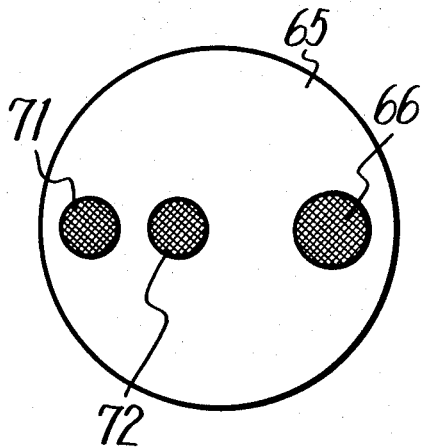
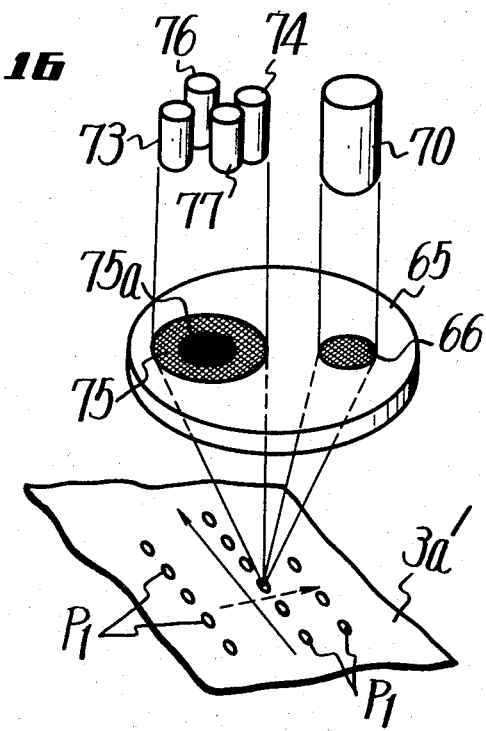

APPARATUS FOR OPTICALLY READING INFORMATION FROM A RECORD CARRIER

BACKGROUND OF THE INVENTION

This invention relates to optical read-out apparatus and, more particularly, to such apparatus which is capable of reading optically detectable indicia by transmitting and focussing a light beam on the surface of an optically encoded medium and by sensing modulations which are imparted to the light beam by the optically encoded information.

Optical read-out apparatus is used to recover information which has been recorded in an optically detectable format on a record carrier. This information may be represented by analog or digital data which is recorded as optically encoded signals. As examples, this information may be video signal information, audio signal information, binary or digital signal information, and the like. The record carrier may be a rotatable disc, a film strip, a movable card or other record carrier capable of having encoded information recorded thereon. The encoded information is in the form of optically detectable indicia, such as markings which diffract, distort, modulate or otherwise modify some parameter of a light beam which is incident thereon. As a typical example, video signal information may be recorded on a video disc as pits which are provided in substantially circular, concentric tracks, or in a single spiral track, whereby the pits modulate the intensity of a light beam which is transmitted to the record disc.

In optical read-out apparatus for a video disc, a source of light, such as a laser, emits coherent light which is directed and focussed by an optical head to a spot on the surface of the disc. The head generally includes various lenses, mirrors and/or prisms to properly control and shape the beam emitted by the laser. If the video information which is recorded on the disc is in the form of pits, the focussed beam is modulated by such pits and then is reflected to photo-detecting devices which convert the intensity modulations of the reflected beam into corresponding electrical signals. These electrical signals then are demodulated so as to recover the video information which had been recorded on the disc. So-called tracking and time-base errors can be sensed by detecting the reflected beam in order to drive suitable servo control circuits for correcting such errors. In some systems, a separate light beam additionally is directed to the video disc, and reflections of this separate beam are used to determine whether the optical head is in a proper focussing condition. Additional servo control circuitry is provided to maintain a correct focussing condition.

Although the optical head which is comprised of one or more optical lenses and mirrors functions in a generally satisfactory manner, the individual optical elements which constitute this head usually are precise optical instruments and are very expensive to manufacture. In addition, the overall structure of the optical head is relatively complex and expensive to assemble. In some applications, the optical head includes an objective lens which serves the dual function of focussing the laser-emitted light beam onto the surface of the video disc and also collecting the light which is reflected from the disc to transmit the reflected light to the photo-detecting devices. The aperture of this objective lens is small to enhance its focussing of the laser-emitted beam and, consequently, this aperture limits the amount of reflected light which can pass through the lens to the photo-detecting devices. As a result, the sensitivity of the read-out apparatus may be limited.

OBJECTS OF THE INVENTION

Therefore, it is an object of the present invention to provide improved optical read-out apparatus which overcomes the aforenoted defects of the prior art.

Another object of this invention is to provide optical read-out apparatus having an improved optical head which does not require highly precise optical mirrors and lenses as heretofore used.

A further object of this invention is to provide apparatus for reading optically detectable indicia from a record carrier having improved sensitivity.

An additional object of this invention is to provide apparatus for reading optical markings on a record carrier wherein a focussing lens system used by the prior art is replaced by a hologram.

Yet another object of this invention is to provide improved apparatus having one or more holograms for use in an optical head to read optically detectable indicia from a record carrier.

Various other objects, advantages and features of this invention will become readily apparent from the ensuing detailed description, and the novel features will be particularly pointed out in the appended claims.

SUMMARY OF THE INVENTION

In accordance with the present invention, apparatus is provided for reading optically detectable indicia which are recorded on a record carrier. A source of coherent light emits a light beam which is transmitted to the record carrier whereat the beam is modulated by the recorded indicia. A hologram receives the transmitted beam and focusses same on the record carrier. One or more photo-detectors are disposed to receive the modulated beam so as to detect the intensity of the coherent light which is transmitted from the record carrier. In a preferred embodiment, the record carrier is a disc which reflects the modulated beam to the photo-detector.

The hologram, as used in this invention, may be formed by recording the interference pattern which is established between a reference beam and a subject beam, the latter diverging from a convergence point to interfere with the reference beam.

BRIEF DESCRIPTION OF THE DRAWINGS

The following detailed description, given by way of example, will best be understood in conjunction with the accompanying drawings in which:

FIG. 1 is a schematic diagram of prior art optical readout apparatus;

FIG. 2A is a schematic diagram of an improved optical head for use with optical read-out apparatus in accordance with the present invention;

FIG. 2B is a plan view of one embodiment of the hologram which can be used with the optical head shown in FIG. 2A;

FIG. 3 is a schematic illustration of the manner in which the hologram can be formed;

FIG. 4 is a schematic illustration of the optical effects achieved by the hologram;

FIG. 6A is a schematic diagram of a still further embodiment of the present invention;

FIG. 6B is a plan view of a portion of the optical head which can be used with the apparatus shown in FIG. 6A;

FIG. 15A is a schematic diagram of an additional embodiment of this invention;

FIG. 15B is a plan view of the optical head used in FIG. 15A; and

FIG. 16 is a perspective diagram of yet another embodiment of this invention.

DETAILED DESCRIPTION OF CERTAIN OF THE PREFERRED EMBODIMENTS

Figure 5A:
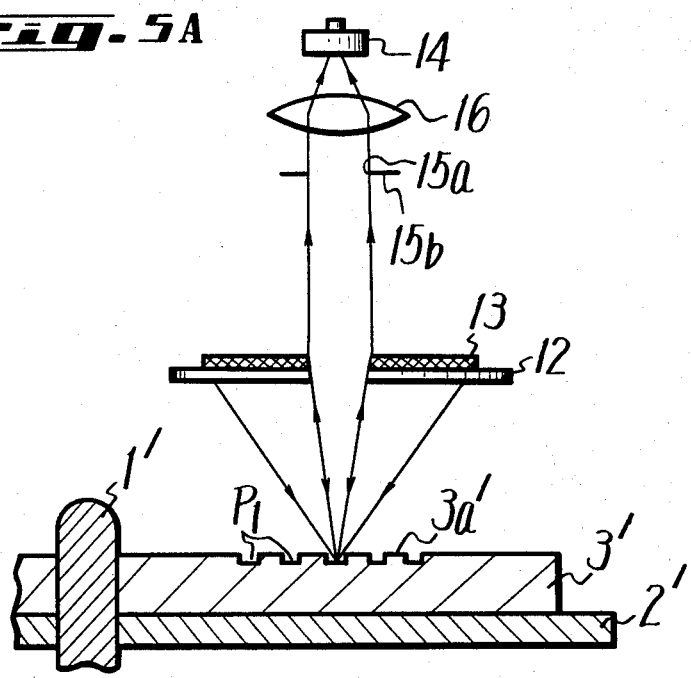
FIGS. 5A and 5B are schematic diagrams of still further embodiments of the present invention.

The present invention is applicable to optical read-out apparatus in general. In such apparatus, information is recorded as optically detectable indicia on a record carrier. This indicia represents analog or digitally recorded information signals. Various uses of such optically recorded indicia are known to those of ordinary skill in the art, such as the storage of data. For the purpose of the present description, this stored data represents video signal information; although the following description is not intended to be limited solely to a video information storage and read-out device. Furthermore, the record carrier upon which the optically detectable indicia are recorded may be either of the selectively transmissive type or selectively reflective type. In the former, the indicia modulates a light beam which is transmitted through the record carrier, and a suitable photo-detector is disposed on the opposite side of the carrier so as to receive the modulated, transmitted beam after is passes through the carrier. When a reflective carrier is used, both the source of light and the photo-detector are disposed on the same side of the carrier. Hence, light which is incident on the carrier is modulated by the indicia and this modulated light is reflected from the carrier to the photo-detector. For the purpose of the present description, it will be assumed that the record carrier upon which the optically detectable indicia are recorded is of the reflective type. The indicia itself may take any one of well-known forms. However, for the purpose of the present description, it will be assumed that the video information recorded on the record carrier is in the form of pits which are disposed in at least one track. The record carrier itself may be a rotatable disc, a movable card or a movable film strip. For the purpose of the present description, it will be assumed that the record carrier is a rotatable disc having substantially concentric record tracks on its surface, the pits being recorded in such tracks. In a preferred embodiment, the record tracks are constituted by a spiral track. Accordingly, the following description will refer to a video disc formed of one or more tracks of pits representing video information, which pits selectively modulate the intensity of light incident thereon, and this modulated light is reflected from the surface of the video disc. Nevertheless, it should be readily understood that other types of record carriers can be used, the optically detectable indicia need not be limited solely to pits, and the information represented by such indicia need not be limited solely to video information.

The advantages achieved by the present invention will best be understood by first considering a typical prior art optical read-out device which has been used to read out and recover video information from a video disc. Turning now to FIG. 1, a video disc 3 has its surface 3a provided with optically detectable indicia represented as pits shown by indentations in the surface. Surface 3a is provided with a reflective layer, such as by vaporization of aluminum, so that the geometric pattern of pits representing the video information serves to selectively reflect light which impinges on surface 3a. A turntable 2 secured to a rotary shaft 1 supports disc 3 and serves to rotate the disc so as to permit the optical scanning of the tracks within which the pits are recorded.

Optical scanning of the tracks on disc 3 is achieved by projecting a laser beam and focussing same to be incident on the tracks. To this effect, a laser device 4 emits a beam of coherent light which is polarized in a predetermined direction. The light beam emitted by laser device 4 passes through a lens 5 and is transmitted over a folded optical path established by a reflecting surface 6, such as a mirror, to pass through a polarizing prism, a quarter-wavelength plate 8 and an objective lens 9 to disc 3. Lens 5 functions to focus the beam emitted by laser device 4 to a point of convergence. This converging point is disposed between mirror 6 and polarizing prism 7. Polarizing prism 7 is a conventional device adapted to transmit light therethrough which is polarized in a predetermined direction but to reflect light which is polarized in a direction perpendicular to that predetermined direction. As shown in FIG. 1, the beam reflected from mirror 6 passes through the aforementioned converging point and then diverges therefrom toward polarizing prism 7. The polarization of the beam transmitted to the polarizing prism from mirror 6 is the predetermined direction such that this beam passes through prism 7 and thence through quarter-wavelength plate 8. A quarter-wavelength plate is a conventional optical component which is adapted to rotate the direction of polarization of a beam passing therethrough. If a given beam passes through this quarter-wavelength plate in a first direction and then is reflected to pass through the very same quarter-wavelength plate in an opposite direction, the resultant beam which passes through this plate the second time has its direction of polarization rotated by 90° with respect to the original beam.

After passing through quarter-wavelength plate 8, the beam emitted from laser device 4 is focussed by objective lens 9 to a spot of predetermined diameter on surface 3a of disc 3. As one example, the beam is focussed to a spot whose diameter is approximately 1 μm (micrometer). The focussed spot is modulated by the pits provided in the track being scanned while disc 3 rotates about shaft 1. Consequently, the intensity of the focussed beam is modulated in accordance with such pits. The modulated beam is reflected from surface 3a of disc 3 back through objective lens 9 and quarter-wavelength plate 8. Thus, by passing through the quarter-wavelength plate in opposite directions, that is, in the transmitting and reflecting directions, the direction of polarization of the reflected beam is rotated by 90° relative to the direction of polarization of the transmitted beam. Hence, the modulated beam which is reflected to polarizing prism 7 has its direction of polarization perpendicular to the predetermined direction associated with this prism and, therefore, is reflected thereby. As shown, this modulated, reflected beam is received by a photo-detector 10, preferably having a predetermined stop, or aperture, to produce an electrical signal whose amplitude varies as a function of the intensity modulations of the beam received by the photo-detector. This electrical signal is amplified by an amplifier 11 and supplied to further apparatus (not shown) for demodulation. This further apparatus recovers the video signal information which had been recorded in the form of pits on surface 3a of disc 3.

As may be appreciated, lens 5, mirror 6, prism 7, quarter-wavelength plate 8 and objective lens 9 comprise an optical head of relatively complex construction and exhibiting substantial mass or weight. If tracking, time-base or focussing errors are present, portions or all of the optical head must be physically moved in order to compensate for such errors. Because of the mass of this optical head, it may be recognized that a significant time delay may be present before such errors can be corrected. Furthermore, the moving or adjustment mechanisms are expensive. Also, because of the usual diaphragm associated with objective lens 9, the reflected light which returns through this objective lens and is transmitted to photo-detector 10 will have its intensity limited by the aperture of that diaphragm. This means that the intensity of the light received by photodetector 10 may be less than desired, thus decreasing the sensitivity of the optical read-out apparatus. Furthermore, and as mentioned above, the overall cost of manufacture and assembly of the illustrated prior art optical head is high.

Turning now to FIG. 2A, one embodiment of improved optical read-out apparatus is shown wherein the problems associated with the prior art optical head shown in FIG. 1 are avoided. In particular, the optical head of FIG. 1 is replaced by a support structure 12, hereinafter referred to as a holder, a hologram 13 supported on holder 12 and a photo-detector 14 also supported on holder 12. Holder 12 may be a plate that is substantially transparent throughout or, alternatively, is transparent in the vicinity juxtaposed with hologram 13 and photo-detector 14. As an example, holder 12 may be formed of glass, and is relatively thin so as to exhibit small mass as compared to the mass of the optical head shown in FIG. 1.

Hologram 13, described in greater detail below, is adapted to receive a coherent beam of light, such as a laser beam emitted from a laser device (not shown) and functions to focus this received beam to a spot on the surface of the record carrier. As shown in FIG. 2A, the record carrier is a disc 3', similar to disc 3 of FIG. 1, and the reference numerals used to identify the video disc and rotary support structure in FIG. 2A are the same as the reference numerals used in FIG. 1 with the addition of a prime. Thus, the beam focussed on the surface 3a' of disc 3' by hologram 13 is reflected from the disc to impinge upon photo-detector 14.

In the embodiment shown, hologram 13 is ring-shaped, such as illustrated in FIG. 2B, and photo-detector 14 is juxtaposed to the center portion of this ring. One of ordinary skill in the art will appreciate that a hologram is the recording of an interference pattern established between a reference wave and a subject wave. In general, a common source of coherent light is used to transmit the reference wave and to irradiate a subject so as to transmit from that subject the subject wave. The reference and subject waves intersect at a location to form an interference pattern or fringe. If a photo-recording medium is disposed in the plane of intersection, a latent image of the interference pattern is produced thereon and may be subsequently developed. When the developed image of the interference pattern subsequently is irradiated with a beam of coherent light, the incident beam is diffracted, generally to form a zero order diffraction beam and higher order diffraction beams. One of these higher order diffraction beams forms a virtual image of the original subject and another of the higher order diffraction beams forms a real image of the original subject. This real image is formed by a converging beam, while the virtual image appears because of a diverging beam whose convergence location defines the virtual image.

The recorded hologram generally is formed on a relatively thin medium, such as a film, and as is conventional, the hologram may be a so-called plane hologram or volume hologram, as desired.

When hologram 13 is used in the embodiment shown in FIG. 2A, the coherent light beam transmitted thereto may be a plane wave. Hologram 13 converts this plane wave beam to a spherical wave beam which is focussed to a spot on pits $P_1$ which are recorded on the surface 3a' of disc 3'. This spherical wave, which is converging, is modulated by pits $P_1$ and is reflected through the central opening of hologram 13 to impinge upon photo-detector 14.

A technique for forming hologram 13 is schematically illustrated in FIG. 3. A laser device 15 emits a beam of coherent light which passes through half-mirror 16 to impinge upon a photo-sensitive plate 17. Although referred to as a plate, the photo-sensitive medium may be a film, a thermoplastic layer, a silver haloid coating or the like.

A portion of the laser beam emitted by laser device 15 is reflected by half-mirror 16 and further reflected by a mirror 18 to a lens 19. Thus, half-mirror 16 serves as a beam-splitter to divide the amplitude of the emitted beam as shown. Lens 19 serves to focus the beam reflected by mirrors 16 and 18 to a location P. The reflected beam $b_2$ then diverges from location P to impinge upon photo-sensitive plate 17 whereat it interferes with the beam which is transmitted through mirror 16. The beam transmitted through mirror 16 may be considered as the reference beam and beam $b_2$ may be considered as the subject beam. Thus, the reference and subject beams form an interference pattern at photo-sensitive plate 17, and it is this interference pattern which is recorded. If lens 19 forms a focussed spot at location P the subject image represented by subject beam $b_2$ may be considered to be the focussed spot. Thus, the hologram recorded on plate 17 is the hologram of a focussed spot, or convergence point, P.

Referring to FIG. 4, the manner in which the hologram formed by the technique shown in FIG. 3 affects particular light beams is shown. Let it be assumed that the interference pattern formed on photo-sensitive plate 17 is developed so as to form hologram 17'. Now, if the apparatus shown in FIG. 3 is modified to the extent that half-mirror 16 is replaced by a "full" mirror 20, but the optical path length between laser device 15 and hologram 17' remains the same, then the beam emitted by laser device 15 is focussed to convergence point P. The beam then diverges from point P and is directed as beam $b_1$ to hologram 17'. Beam $b_1$ which is an off-axis beam as shown, is a spherical wave which is converted by the hologram to a plane wave. This plane wave is transmitted from hologram 17' as beam $b_2$. Thus, one function of hologram 17' is to convert a diverging spherical wave, represented as beam $b_1$, to a plane wave represented as beam $b_2$. The propagation of beam $b_2$ is similar to that of the beam emitted by laser device 15.

Now, let it be assumed that beam $b_2$, which is similar to the beam emitted by laser device 15, is transmitted in the opposite direction, as shown by beam $b_2'$. Beam $b_2'$ is a plane wave and is incident on hologram 17'. This hologram now functions to convert the plane wave to a spherical wave, represented as beam $b_1'$, this spherical wave converging to convergence point P. Convergence point P of converging wave $b_1'$ is coincident with convergence point P of diverging beam $b_1$. If hologram 17' is used as hologram 13 in FIG. 2A, it is appreciated that the beam transmitted thereto by the laser device (not shown in FIG. 2A) corresponds to beam $b_2'$ and is converged by the hologram to point P on the surface $3a'$ of disc 3'. This focussed spot is modulated by pits $P_1$ and is reflected by disc 3' to photodetector 14.

As may be appreciated, the optical head formed of holder 12 and hologram 13 is quite simplified when compared to the prior art optical head illustrated in FIG. 1. Furthermore, this simplified head exhibits relatively low mass and can be easily adjusted by a simple mechanism to correct for various errors. Also, because of the low mass of this head, the response time for error correction is reduced. Still further, since the improved head avoids the necessity of an objective lens, the usual stop element associated with that lens is not needed. As a result, the intensity of the reflected beam impinging upon photo-detector 14 is not unnecessarily limited, and the sensitivity of the improved optical read-out apparatus is increased. The amount of light flux received by the photo-detector can, therefore, be determined merely by the aperture of the photo-detector.

Figure 5B:
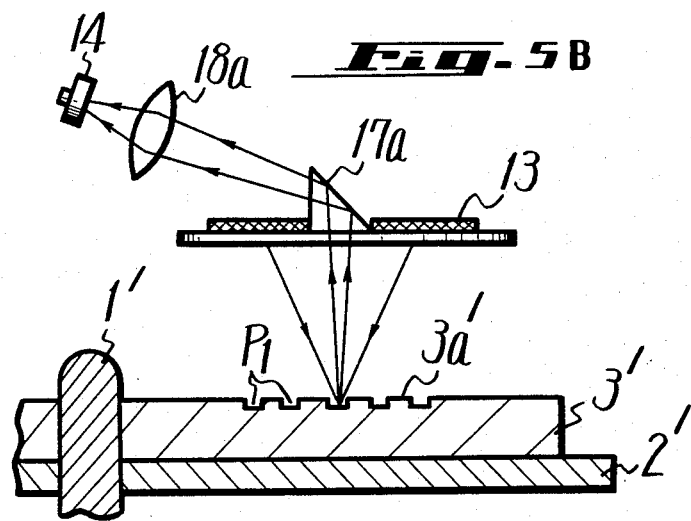

Since hologram 13 converts the incident plane wave laser beam to a converging spherical wave beam which is focussed on surface $3a'$ of disc 3' to be modulated by pits $P_1$ and reflected back along the axis of the ring-shaped hologram, the embodiment of FIG. 2A can be modified as shown in FIGS. 5A and 5B. Thus, photo-detector 14 need not be supported on holder 12 but, rather, may be located at a position spaced from the holder. In FIG. 5A, the reflected beam may pass through the opening $15a$ of a light shield $15b$ to be focussed by a lens 16 on the photo-detector. Although light shield $15b$ is used, this does not reduce the intensity of light reflected to the photo-detector by an undesirable amount. In FIG. 5B, a reflecting prism $17a$ reflects the returning, modulated beam to a lens $18a$ which focusses the modulated beam upon photo-detector 14.

In the embodiments of FIGS. 5A and 5B, the amount of light flux received by photodetector 14 may be selected as a function of light shield $15b$ and/or the diameter of the central opening of hologram 13. Hence, reflected light flux and photo-detector response can be matched relatively easily.

Figure 5C:
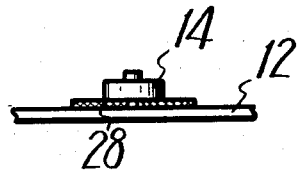
FIGS. 5C and 5D are schematic diagrams of various embodiments of the optical head which can be used with this invention.
Figure 5D:
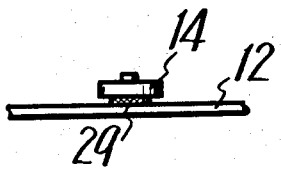

If photo-detector 14 is supported by holder 12, as in the FIG. 2A embodiment, the amount of light flux received by the photo-detector can be selected, as desired, by providing suitable light blocking members. In FIG. 5C, the light blocking member is a stop member 28 having a selected aperture. This may be similar to light shield $15b$ shown in FIG. 5A. In FIG. 5D, the light blocking member is a mask 29 which may be considered to be the inverse of stop 28. Another function of the illustrated light blocking members is to selectively block some orders of the diffraction beams while passing others to the light detector. Hence, the zero order diffraction beam, also known as the simple component of reflected light, or selected ones of the higher order diffraction beams can be transmitted to the photo-detector.

Another embodiment of an improved optical head in accordance with the present invention is shown in FIGS. 6A and 6B. In FIG. 6A, a holder 21 supports a hologram 22 and individual photo-detectors 23 and 24. Hologram 22 functions in the manner described hereinabove to convert the plane wave laser beam to a converging spherical wave beam for focussing on surface $3a'$ of disc 3'. Photo-detectors 23 and 24 are supported upon holder 21 and are particularly disposed so as to intercept the higher order diffraction beams which are reflected from surface $3a'$. FIG. 6B represents the relative locations on holder 21 whereat hologram 22 and photo-detectors 23 and 24 are positioned. If desired, holder 21 may be opaque except for those portions juxtaposed with the hologram and photo-detectors, which portions are substantially transparent.

Figure 7:
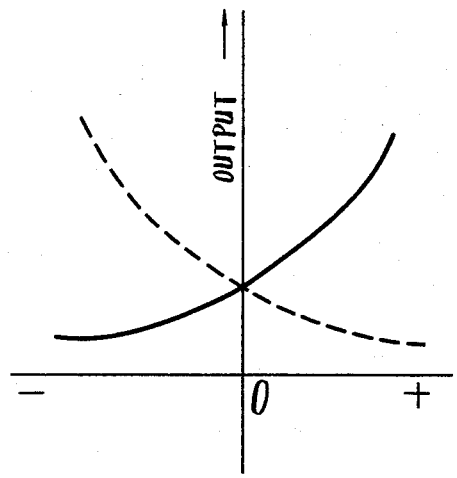
FIG. 7 is a graphical representation of the manner in which the embodiment shown in FIG. 6A can be used.

The embodiment of FIG. 6A is readily adapted to detect tracking errors wherein the spot focussed on the surface $3a'$ of disc 3' deviates from the track being scanned. Let it be assumed that a track is represented by the cross-sectional depression, or groove, and that the focussed spot may deviate in a radial direction from the scanned track. Since different optical paths are traversed by the higher order diffraction beams reflected from surface $3a'$ to photo-detectors 23 and 24, the aforementioned tracking errors will produce corresponding changes in the intensities of these respective reflected beams. For example, if the focussed spot incident on surface $3a'$ deviates from its predetermined incidence location relative to the scanned track, the electrical signal produced by one of the photo-detectors will increase while the electrical signal produced by the other photo-detector will decrease. This is graphically depicted in FIG. 7 wherein the ordinate represents the output signal level and the abscissa represents incident beam deviation. The solid curve of FIG. 7 corresponds to, for example, the signal produced by photo-detector 23 and the broken curve corresponds to the signal produced by photo-detector 24. When the focussed beam is displaced in the positive direction, that is, from left to right, the signal produced by photo-detector 23 increases while that produced by photo-detector 24 decreases. When the focussed beam is displaced in the opposite, negative direction, the signal produced by photo-detector 24 increases while that produced by photo-detector 23 decreases. This beam displacement is relative to a scanned track and, generally, is caused by the actual movement of disc 3' with respect to the beam incident thereon.

Figure 8:
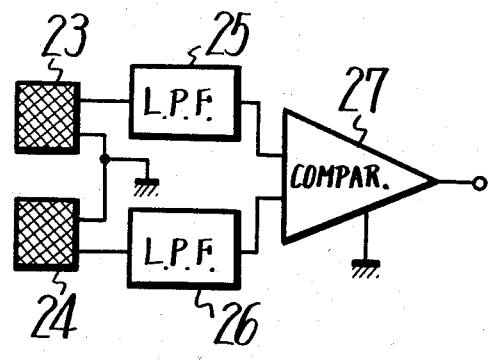
FIG. 8 is a schematic diagram of tracking control circuitry which can be used with the embodiment shown in FIG. 6A.

In FIG. 8, an example of a tracking-error detecting circuit is schematically illustrated. As shown, photo-detectors 23 and 24 may be connected electrically through low-pass filters 25 and 26, respectively, to separate inputs of a comparator 27. The output of comparator 27 is of a magnitude and polarity representing the direction and amount of relative displacement of the beam with respect to the scanned track. This output is the tracking error signal and may be used to control a servo control device whereby the tracking error is compensated. As an alternative, and as appreciated from the graphical illustration of FIG. 7, tracking errors can be detected and compensated merely by using only one of photo-detectors 23 and 24. That is, the signal level produced in accordance with, for example, the solid curve of FIG. 7 (or the broken curve) can be used to represent the direction and magnitude of the tracking error.

Figure 9A:
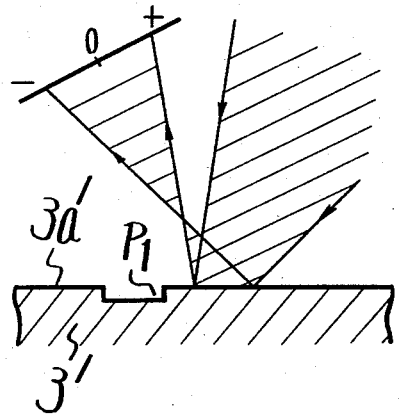
FIGS. 9A–9C depict the manner in which the embodiment shown in FIG. 6A functions to correct tracking errors.
Figure 9B:
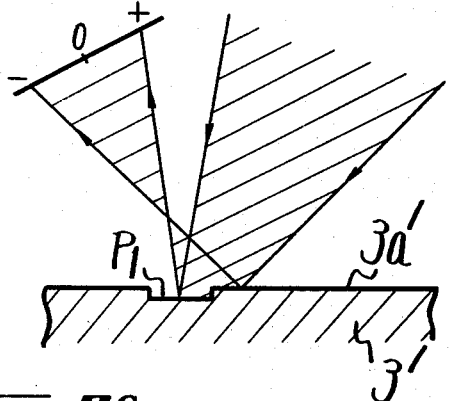
Figure 9C:
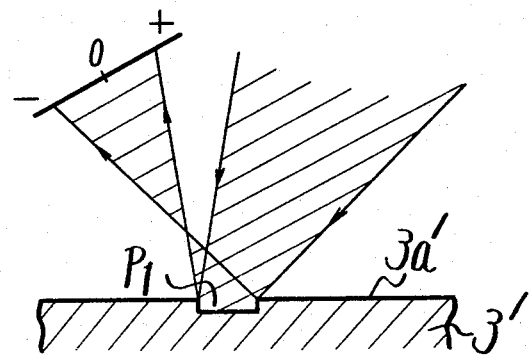
Figure 10:
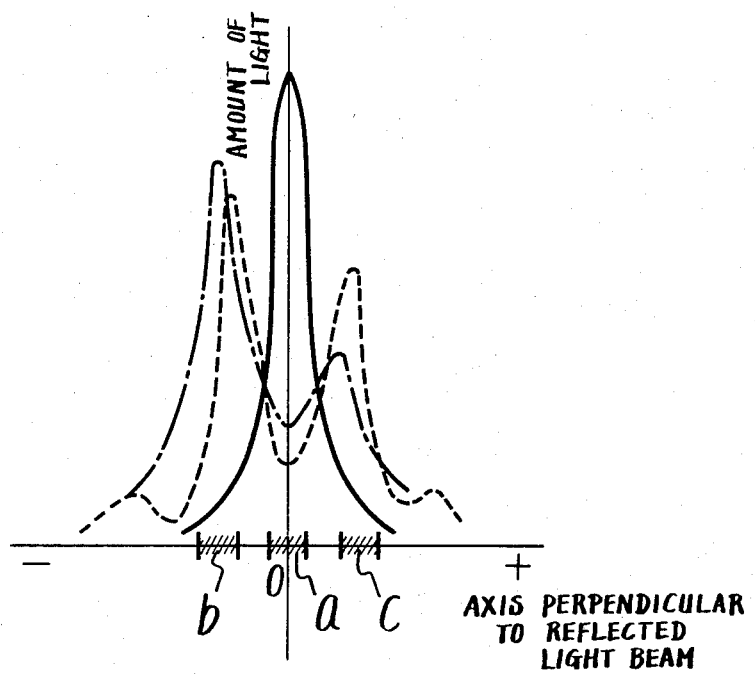
FIG. 10 is a graphical representation of the distribution of light which is reflected to the optical head shown in FIG. 6A.

As a further explanation of this tracking error detecting capability, reference is made to FIGS. 9A-9C and FIG. 10. Let it be assumed that the beam focussed onto surface 3a' of disc 3' by hologram 22 has a diameter of 10 μm, as shown in FIGS. 9A-9C. This focussed beam is reflected from surface 3a' with respective intensities for the zero order diffraction beam and higher order diffraction beams. Let it assumed that the reflected zero order diffraction beam is transmitted along a center line O, the +1 order diffraction beam is transmitted along the line "+" and the −1 order diffraction beam is transmitted along the line "−" as shown in FIGS. 9A-9C. FIG. 10 is a graphical depiction of the intensities of the reflected beams along the axis shown in FIGS. 9A-9C, this axis being substantially perpendicular to the optical path traversed by the zero order diffraction beam. If the beam incident on surface 3a' is as shown in FIG. 9A, the intensity distribution measured along the axis is as shown by the solid curve in FIG. 10. That is, when the incident light beam is as shown in FIG. 9A, the reflected beam is comprised substantially of the zero order diffraction beam. Thus, maximum intensity will be detected along the zero order path while minimum intensities will be detected along the +1 and −1 order paths. If the beam incident on surface 3a' is as shown in FIG. 9B, the intensity distribution of the reflected light appears as shown by the one-dot chain curve of FIG. 10. Thus, the intensities of the higher order diffraction beams are greater than the intensity of the zero order diffraction beam. If photo-detectors are disposed at locations corresponding to locations b and c in FIG. 10, these photo-detectors will produce output signals of greater amplitude when the incident beam is as shown in FIG. 9B than when the incident beam is as shown in FIG. 9A. Now, if the beam incident on disc 3' is as shown in FIG. 9C, the intensity distribution will appear as represented by the broken curve of FIG. 10 wherein maximum intensities are included in the higher order diffraction beams. Thus, if photo-detectors are located at positions corresponding to positions b and c of FIG. 10, the output signals produced thereby when the incident beam is as shown in FIG. 9C are of greater amplitude than when the incident beam is as shown in FIG. 9A. Furthermore, the particular signal levels produced for the FIG. 9C beam geometry differ from the amplitudes of the signals produced in response to the FIG. 9B beam geometry. Consequently, by detecting these signals, the amount and direction of beam deviation with respect to pit $P_1$ can be detected. Thus, photo-detectors 23 and 24 may be positioned on holder 21 at locations corresponding to positions b and c of FIG. 10.

While the foregoing description has referred to the +1 order diffraction beam and −1 order diffraction beam, it is appreciated that other orders can be detected, as desired. The intensity distributions shown in FIG. 10 by the one-dot chain curve and by the broken curve thus may correspond to these other higher order diffraction beams. While the locations of photo-detectors 23 and 24 at positions corresponding to positions b and c will result in the detection of these higher order diffraction beams, it is appreciated that if the photo-detectors are located at positions corresponding to position a in FIG. 10, the output signal produced by these positioned photo-detectors will correspond to the intensity of the zero order diffraction beam shown by the solid curve in FIG. 10.

Figure 11:
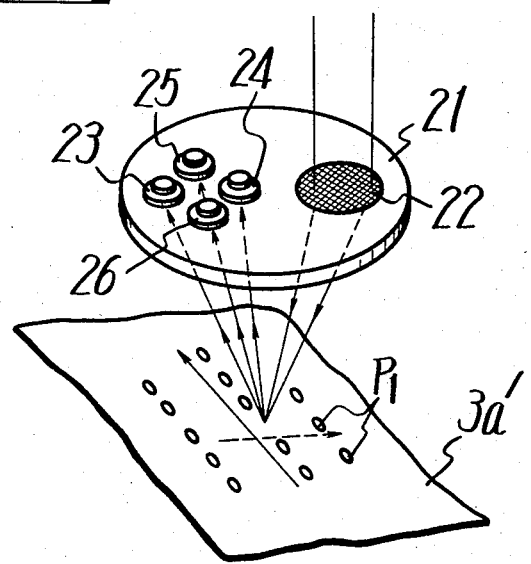
FIG. 11 is a perspective sketch showing a still further embodiment of the present invention.

If the higher order diffraction beams are detected, and if the diameter of the focussed spot incident on surface 3a' is smaller than the diameter of a pit $P_1$, the embodiment shown in FIG. 11 can be used advantageously. In this embodiment, photo-detectors 23 and 24 are supported by holder 21, as in the embodiment described previously with respect to FIG. 6A, and additional photo-detectors 25 and 26 also are supported by the holder. If the direction in which the tracks on disc 3' are scanned is represented by the solid arrow shown in FIG. 11, and if lateral tracking errors are represented by the broken arrow, additional photo-detectors 25 and 26 are disposed in the scanning direction to increase the tracking-error detecting sensitivity.

Figure 12:
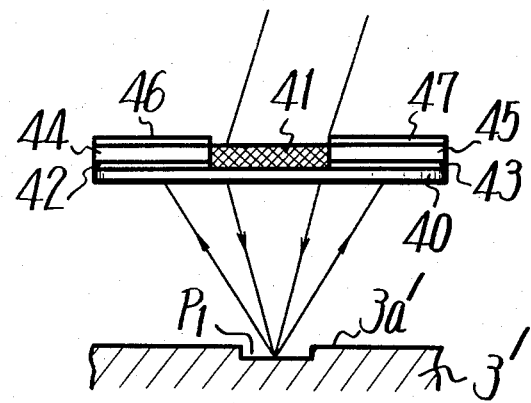
FIG. 12 is a schematic diagram of an additional embodiment of the present invention.

Still another embodiment of the present invention is illustrated in FIG. 12 wherein a hologram 41 is supported on a holder 40 together with two photo-detectors. Hologram 41 is adapted to convert an incident plane wave beam emitted from a laser device to a converging spherical wave beam to be focussed on the surface 3a' of disc 3'. The incident beam may be an off-axis beam, and the beams which are reflected from surface 3a' traverse different optical paths and may be the higher order diffraction beams. The photo-detectors are shown as being formed of layers 44 and 45, respectively, of photo-conductive material, each layer being interposed between a respective pair of electrodes 42, 46 and 43, 47. In view of the optical paths traversed by the various beams illustrated in FIG. 12, it is appreciated that holder 40 is substantially transparent, and each of electrodes 42 and 43 likewise is transparent. Hence, reflected beams pass through holder 40 and transparent electrodes 42 and 43 to impinge upon photo-conductive layers 44 and 45. As examples of suitable photo-conductive material constituting layers 44 and 45, cadmium sulphide ($C_dS$), selenium ($S_e$) and cadmium telluride ($C_dT_e$) can be used.

Figure 13:
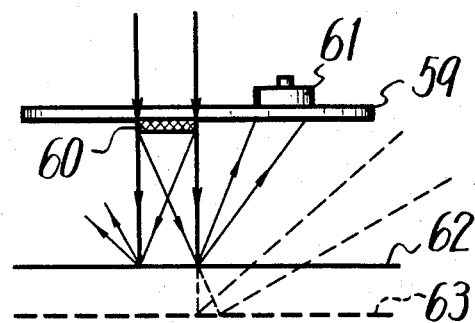
FIG. 13 is a schematic diagram of yet a further embodiment of the present invention.

It is recalled that the focussing condition of the prior art optical head shown in FIG. 1 can be detected and controlled by using an additional light beam. This additional light beam passes through objective lens 9 (FIG. 1) in common with the main scanning beam and the intensity of the reflected additional beam from the surface of the video disc is indicative of the focussing condition of the objective lens. Compensating measures, such as adjusting the relative position of the objective lens, then can be taken to compensate for focussing errors. A similar type of focus detection and control technique can be achieved in accordance with the present invention. Referring to FIG. 13, a holder 59 supports a hologram 60 and a photo-detector 61. Hologram 60 differs from the aforedescribed hologram in that it converts an incident plane wave laser beam into two converging spherical wave beams, as shown. These two beams impinge upon separate portions of the record carrier, the latter being represented by the solid line 62. The right-most converging beam is reflected from disc 62 toward photo-detector 61. The combination of this beam and the photo-detector can be used to determine whether the distance between hologram 60 and disc 62 is of the proper focussing distance. That is, if the leftmost converging beam transmitted by hologram 60 is considered to be the main scanning beam, the focussing condition of this beam on video disc 62 can be determined by sensing the intensity of the reflection of the right-most beam to photo-detector 61.

Let it be assumed that video disc 62 is subjected to displacement relative to holder 59 and hologram 60. This is represented as up-and-down movement of the video disc due to, for example, geometric irregularities in the disc or other disturbances in its rotary support structure. If the distance between the video disc and hologram 60 increases, such as represented by broken line 63, it is seen that the right-most converging beam transmitted by the hologram is reflected from the displaced disc 63 along an optical path which differs from that when the disc occupies its correct position represented by line 62. Thus, the intensity of the light beam received by photo-detector 61 changes from a predetermined value in the event that the focussing condition of the optical head is changed by, for example, fluctuations of the video disc. For the purpose of detecting the focussing condition of the optical head, photo-detector 61 may be positioned so as to receive the zero order diffraction beam which is reflected from the video disc.

The manner in which hologram 60 may be produced now will be briefly described. This hologram may be considered as the superposition of two holograms each formed by the technique shown in FIG. 3. With reference to FIG. 3, a first exposure of photo-sensitive plate 17 may be made by using the optical geometries shown therein. Then, a second exposure of the photo-sensitive plate may be made by shifting the angle of half-mirror 16 so as to reflect a portion of the laser beam emitted by laser device 15 in the downward direction. Thus, a second convergence point similar to point P may be located below the reference beam and symmetrical with illustrated convergence point P. Then, the double exposure of photo-sensitive plate 17 can be developed to form hologram 60. The resultant hologram converts an incident plane wave laser beam to the two spherical wave converging beams shown in FIG. 13. As an alternative, hologram 60 may be formed of two laminates, one being formed by the geometry shown in FIG. 3 and the other being formed by a complementary geometry wherein the convergence point is located symmetrical to point P below the reference beam.

Figure 14:
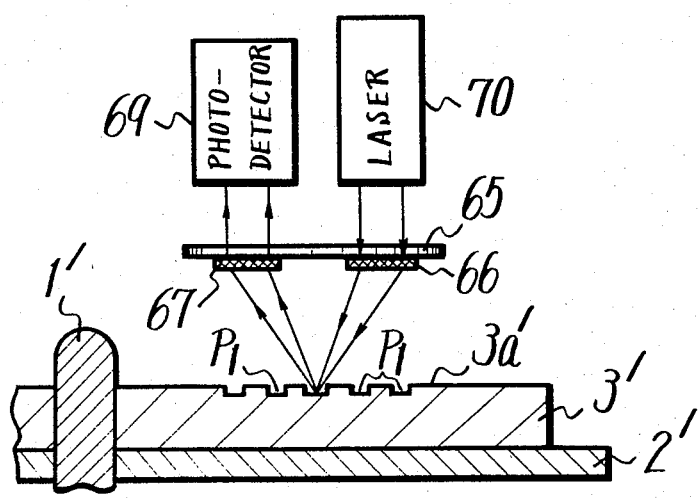
FIG. 14 is a schematic diagram of another embodiment of this invention.

A still further embodiment of the present invention is illustrated in FIG. 14. As shown, a holder 65 supports a hologram 66, referred to as an input hologram, and other hologram 67, referred to as an output hologram. Input hologram 66 functions in the now-understood manner to convert the incident planar wave laser beam emitted from a laser device 70 to a spherical wave converging beam which is focussed on surface 3a' of video disc 3'. This focussed beam is reflected from surface 3a' as a diverging beam toward output hologram 67. From FIG. 4, it is recalled that if a spherical wave diverging beam, such as beam $b_1$, is transmitted to the hologram, this beam is converted to a parallel wave beam, such as beam $b_2$. The propagation of converted beam $b_2$ is similar to that of the original laser beam. Therefore, it may be appreciated that when surface 3a' of video disc 3' (FIG. 14) reflects the spherical wave converging beam to output hologram 67, this output hologram converts the beam to a plane wave beam which propagates in a manner similar to the original laser beam emitted by laser device 70. A photo-detector 69 is disposed to receive the converted output beam produced by hologram 67. Accordingly, the intensity of the light beam reflected from disc 3' and transmitted to photo-detector 69 by hologram 67 is modulated by pits $P_1$. Photo-detector 69 thus produces an electrical signal representing the video information which is recorded by pits $P_1$. As may be appreciated, input hologram 66 and output hologram 67 may be formed in the manner described previously with respect to FIGS. 3 and 4.

The embodiment shown in FIG. 14 can be modified in a manner thereby tracking errors, such as those errors described with respect to FIG. 6A, can be detected. This modification is shown in FIG. 15A wherein holder 65 is provided with input hologram 66 and, additionally, with two output holograms 71 and 72, respectively. The output holograms receive spherical wave diverging beams which are reflected thereto from surface 3a' of disc 3' via different optical paths, as shown. The reflected beams received by holograms 71 and 72 are higher order diffraction beams, as described previously with respect to FIG. 6A. Output holograms 71 and 72 convert these beams to plane wave beams which are propagated to photo-detectors 73 and 74, respectively.

A plan view of holder 65 supporting holograms 66, 71 and 72 is shown in FIG. 15B. The tracking error detecting operation performed by the embodiment shown in FIGS. 15A and 15B is substantially similar to that described hereinabove with respect to FIGS. 7-10. Thus, any deviation in the focussed beam transmitted to disc 3' by hologram 66 from the predetermined location of incidence of that beam is detected by photo-detectors 73 and 74, and a servo control compensating operation is performed to correct this tracking error. Consequently, the tracks within which pits $P_1$ are recorded are scanned accurately.

The embodiment of FIGS. 15A and 15B may be further modified in a manner which is analogous to the embodiment of FIG. 11, as shown in FIG. 16. In this further modification, holder 65 supports input hologram 66 and an output hologram 75, the latter being provided with a mask or light stop 75a such that the output hologram essentially is ring-shaped. Photo-detectors 76 and 77 are provided in addition to photo-detectors 73 and 74, and in this embodiment the focussed spot transmitted to surface 3a' by input hologram 66 may have a diameter which is smaller than the diameter of a pit $P_1$. Thus, the embodiment of FIG. 16 is similar to the embodiment of FIG. 11 in that the tracking error detecting sensitivity is increased.

Photo-detectors 73, 74, 76 and 77 are disposed to receive the higher order diffraction beams. Accordingly, stop 75a serves to block the zero order diffraction beam reflected from surface 3a', thereby avoiding interference of this zero order diffraction beam with the higher order diffraction beam.

While the present invention has been particularly shown and described with reference to preferred embodiments, it should be readily apparent that various changes and modifications in form and details may be made by one of ordinary skill in the art without departing from the spirit and scope of the invention. For example, the holograms may be produced by off-axis or on-axis imaging. Similarly, the spot which is focussed onto the surface of the video disc may be produced by off-axis or on-axis illumination of the hologram. Further, the illumination which is used to form the hologram may differ from the beam which illuminates the hologram to form the focussed spot on the video disc. The manner in which the hologram is formed may be by the amplitude division technique of the reference beam shown in FIG. 3 or, alternatively, may be by the so-called wavefront division. Depending upon the medium which is used to record the hologram and the development process which is selected, the hologram may be an absorption hologram, a phase hologram, a plane hologram or a volume hologram. Typical recording media for producing the hologram may be silver-halide emulsion, dichromated gelatin films, photo-conductor-thermoplastic films, photochromic materials or ferro-electric crystals. A more complete description of the formation and use of holograms, as well as a physical explanation thereof is found in "Optical Holography" by Collier, Burckhardt and Lin (1971, Academic Press).

It is intended that the appended claims be interpreted to include the aforementioned as well as various other similar changes and modifications.

What is claimed is:

1. Apparatus for reading optically detectable indicia on a reflective record carrier, comprising:
    a source of coherent light for transmitting a coherent beam of light in an optical path from said source to said record carrier;
    a first hologram formed by the recording of an interference pattern established between reference and subject light beams, with said subject beam diverging from a convergence point to interfere with said reference beam;
    means supporting said first hologram in said optical path of the coherent light beam so that said first hologram focuses said coherent light on said record carrier and the focused coherent light is modulated by said indicia;
    photo-detecting means disposed in a predetermined optical path traversed by the modulated coherent light for detecting the intensity of said coherent light received thereby; and
    a second hologram formed by the recording of an interference pattern established between a reference light beam and a subject light beam which diverges from a convergence point to interfere with the respective reference beam, said second hologram being disposed to intercept the coherent light directed toward said photo-detecting means.

2. Apparatus for reading optically detectable indicia on a reflective record carrier, comprising:
    a source of coherent light for transmitting a coherent beam of light in an optical path from said source to said record carrier;
    a hologram formed by the recording of an interference pattern established between reference and subject light beams, with said subject beam diverging from a convergence point to interfere with said reference beam;
    means supporting said hologram in said optical path of the coherent light beam so that said hologram focuses said coherent light on said record carrier and the focused coherent light is modulated by said indicia;
    photo-detecting means disposed in a predetermined optical path traversed by the modulated coherent light for detecting the intensity of said coherent light received thereby; and
    an additional hologram formed by the recording of an interference pattern established between a reference light beam and a subject light beam which diverges from a convergence point to interfere with said reference beam, said additional hologram being supported on said means for supporting the first-mentioned hologram and disposed to intercept the coherent light reflected toward said photo-detecting means from said record carrier, wherein said source of coherent light transmits a coherent beam formed of plane waves, said first-mentioned hologram converts said plane waves to converging spherical waves, and said additional hologram converts diverging spherical waves to plane waves.

3. The apparatus of claim 2 wherein said means for supporting said hologram comprises a support plate having at least portions thereof which are transparent, said transparent portions permitting said coherent light to be transmitted through said holograms.

4. The apparatus of claim 2 wherein said photo-detecting means comprises plural photo-detectors.

5. The apparatus of claim 4 wherein said additional hologram comprises plural hologram elements equal in number to the number of photo-detectors and each disposed to direct plane waves of reflected coherent light to a respective photo-detector.

6. The apparatus of claim 4 wherein said additional hologram comprises a single hologram element common to all of said photo-detectors and having a masked portion to prevent light beams of a predetermined order diffraction from being transmitted.

* * * * *